(12) United States Patent
Segev et al.

(10) Patent No.: US 11,934,684 B2
(45) Date of Patent: Mar. 19, 2024

(54) MAXIMUM DATA TRANSFER SIZE PER TENANT AND COMMAND TYPE

(71) Applicant: Western Digital Technologies, Inc., San Jose, CA (US)

(72) Inventors: Amir Segev, Meiter (IL); Shay Benisty, Beer Sheva (IL)

(73) Assignee: Western Digital Technologies, Inc., San Jose, CA (US)

( * ) Notice: Subject to any disclaimer, the term of this patent is extended or adjusted under 35 U.S.C. 154(b) by 225 days.

(21) Appl. No.: 17/550,175

(22) Filed: Dec. 14, 2021

(65) Prior Publication Data

US 2023/0185475 A1 Jun. 15, 2023

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC .... G06F 3/0655; G06F 3/0604; G06F 3/0679; G06F 2013/0062; G06F 2013/0064; G06F 3/0613; G06F 3/0659; G06F 3/0617; G06F 3/0611
See application file for complete search history.

(56) References Cited

U.S. PATENT DOCUMENTS

| | | | |
|---|---|---|---|
| 8,407,407 B1 | 3/2013 | Adler et al. | |
| 9,075,708 B1 | 7/2015 | Kang et al. | |
| 9,645,739 B2 | 5/2017 | Veal et al. | |
| 9,652,376 B2 | 5/2017 | Kuzmin et al. | |
| 9,720,860 B2 | 8/2017 | Rose et al. | |
| 9,904,609 B2 | 2/2018 | Miomo | |
| 10,282,132 B2 | 5/2019 | A et al. | |
| 10,445,013 B2 | 10/2019 | Lei et al. | |
| 10,732,895 B2 * | 8/2020 | Earhart | G06F 3/0659 |
| 10,761,775 B2 | 9/2020 | Kachare et al. | |
| 10,901,624 B1 | 1/2021 | Benisty | |
| 10,901,733 B1 | 1/2021 | Benisty | |
| 10,996,985 B2 * | 5/2021 | Kuttan | G06F 9/546 |

(Continued)

OTHER PUBLICATIONS

Bjorling, Matias et al.; "LightNVM: The Linux Open-Channel SSD Subsystem"; Usenix, The Advanced Computing Systems Association; 15th USENIX Conference on File and Storage Technologies (FAST '17); https://www.usenix.org/conference/fast17/technical-sessions/presentation/bjorling; Santa Clara, CA, Feb. 27-Mar. 2, 2017 (17 pages).

(Continued)

*Primary Examiner* — Idriss N Alrobaye
*Assistant Examiner* — Richard B Franklin
(74) *Attorney, Agent, or Firm* — PATTERSON + SHERIDAN, LLP

(57) ABSTRACT

A data storage device includes a memory device and a controller coupled to the memory device. The controller is configured to determine a maximum bandwidth of an interface, allocate a portion of the maximum bandwidth to one or more tenants, either: determine a maximum data transfer size (MDTS) setting based on quality of service (QoS) requirements, determine an aggregated queue depth (QD) setting based on QoS requirements, or determine a combined MDTS and aggregated QD setting based on QoS requirements, and provide the determined settings to the one or more tenants.

20 Claims, 5 Drawing Sheets

(56) References Cited

U.S. PATENT DOCUMENTS

| | | | |
|---|---|---|---|
| 2007/0195367 A1 | 8/2007 | Kumagai et al. | |
| 2017/0308329 A1 | 10/2017 | A et al. | |
| 2018/0088841 A1 | 3/2018 | Ma et al. | |
| 2018/0225065 A1 | 8/2018 | Singh et al. | |
| 2018/0260148 A1 | 9/2018 | Klein | |
| 2019/0079702 A1 | 3/2019 | Yeon et al. | |
| 2019/0095123 A1 | 3/2019 | Lin | |
| 2019/0166201 A1 | 5/2019 | Choi et al. | |
| 2019/0324692 A1 | 10/2019 | Kuwamura | |
| 2020/0089537 A1* | 3/2020 | Bahirat | G06F 9/468 |
| 2021/0392083 A1* | 12/2021 | Bahirat | H04L 47/83 |

OTHER PUBLICATIONS

International Search Report and Written Opinion issued in corresponding International Patent Application No. PCT/US2020/023177, dated Jul. 7, 2020 (7 pages).

\* cited by examiner

MAXIMUM DATA TRANSFER SIZE PER TENANT AND COMMAND TYPE

BACKGROUND OF THE DISCLOSURE

Field of the Disclosure

Embodiments of the present disclosure generally relate to data storage devices, such as solid state drives (SSDs), and, more specifically, improving quality of service (QoS) based on adjusting data transmission size (MDTS) per tenant and per command type.

Description of the Related Art

When a single non-volatile memory (NVM) express (NVMe) SSD is working with multiple tenants, controller and interface resources are shared between the multiple tenants. At the initialization phase (e.g., when a host device makes a connection with the data storage device), the data storage device advertises a maximum data transfer size (MDTS) to the host device. The MDTS indicates the maximum data transfer size between the host device and data storage device. If the host device sends a command that exceeds the MDTS, the command is aborted and the data storage device returns a status of "Invalid Field in Command" to the host device. A value of 0h in the transfer header indicates that there is no restrictions on transfer size. The restriction in transfer size includes metadata if the metadata is interleaved with logical block data. However, the restriction in transfer size does not apply to commands that do not transfer data between the host device and the controller (e.g., write uncorrectable command or write zeroes command).

In order to improve quality of service (QoS), each tenant may be given the same MDTS as the tenant with the least bandwidth allocation share, the time slot may be increased for the guaranteed bandwidth for each tenant, or a long data transfer may be split into smaller data transfers. However, with each previously mentioned approach, the QoS may still be impacted when executing short commands or long commands.

Therefore, there is a need in the art for providing a different MDTS per tenant and command type based on QoS requirements.

SUMMARY OF THE DISCLOSURE

The present disclosure generally relates to data storage devices, such as solid state drives (SSDs), and, more specifically, improving quality of service (QoS) based on adjusting maximum data transmission size (MDTS) per tenant and per command type. A data storage device includes a memory and a controller coupled to the memory. The controller is configured to determine a maximum bandwidth of an interface, allocate a portion of the maximum bandwidth to one or more tenants, either: determine a MDTS setting based on quality of service (QoS) requirements, determine an aggregated queue depth (QD) setting based on QoS requirements, or determine a combined MDTS and aggregated QD setting based on QoS requirements, and provide the determined settings to the one or more tenants.

In one embodiment, a data storage device includes a memory and a controller coupled to the memory. The controller is configured to determine a maximum bandwidth of an interface, allocate a portion of the maximum bandwidth to one or more tenants, and provide a maximum data transfer size (MDTS) to each of the one or more tenants based on the portion of the maximum bandwidth allocated to the one or more tenants.

In another embodiment, a data storage device includes a memory and a controller coupled to the memory. The controller is configured to determine a bandwidth allocation percentage for one or more tenants, wherein each of the one or more tenants has at least a read bandwidth and a write bandwidth, and allocate a maximum data transfer size (MDTS) for each of the one or more tenants based on an aggregated queue depth (QD) setting for each of the one or more tenants based on the bandwidth allocation percentage for the one or more tenants.

In another embodiment, a data storage device includes memory means, a controller coupled to the memory means. The controller includes a host interface module (HIM) coupled to a host device, one or more processors, one or more NVMe modules, one or more aggregated queue depth (QD) modules, and one or more QD limiters.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), and, more specifically, improving quality of service (QoS) based on adjusting maximum data transmission size (MDTS) per tenant and per command type. A data storage device includes a memory and a controller coupled to the memory. The controller is configured to determine a maximum bandwidth of an interface, allocate a portion of the maximum bandwidth to one or more tenants, either: determine a MDTS setting based on quality of service (QoS) requirements, determine an aggregated queue depth (QD) setting based on QoS requirements, or determine a combined MDTS and aggregated QD setting based on QoS requirements, and provide the determined settings to the one or more tenants.

Figure 1:
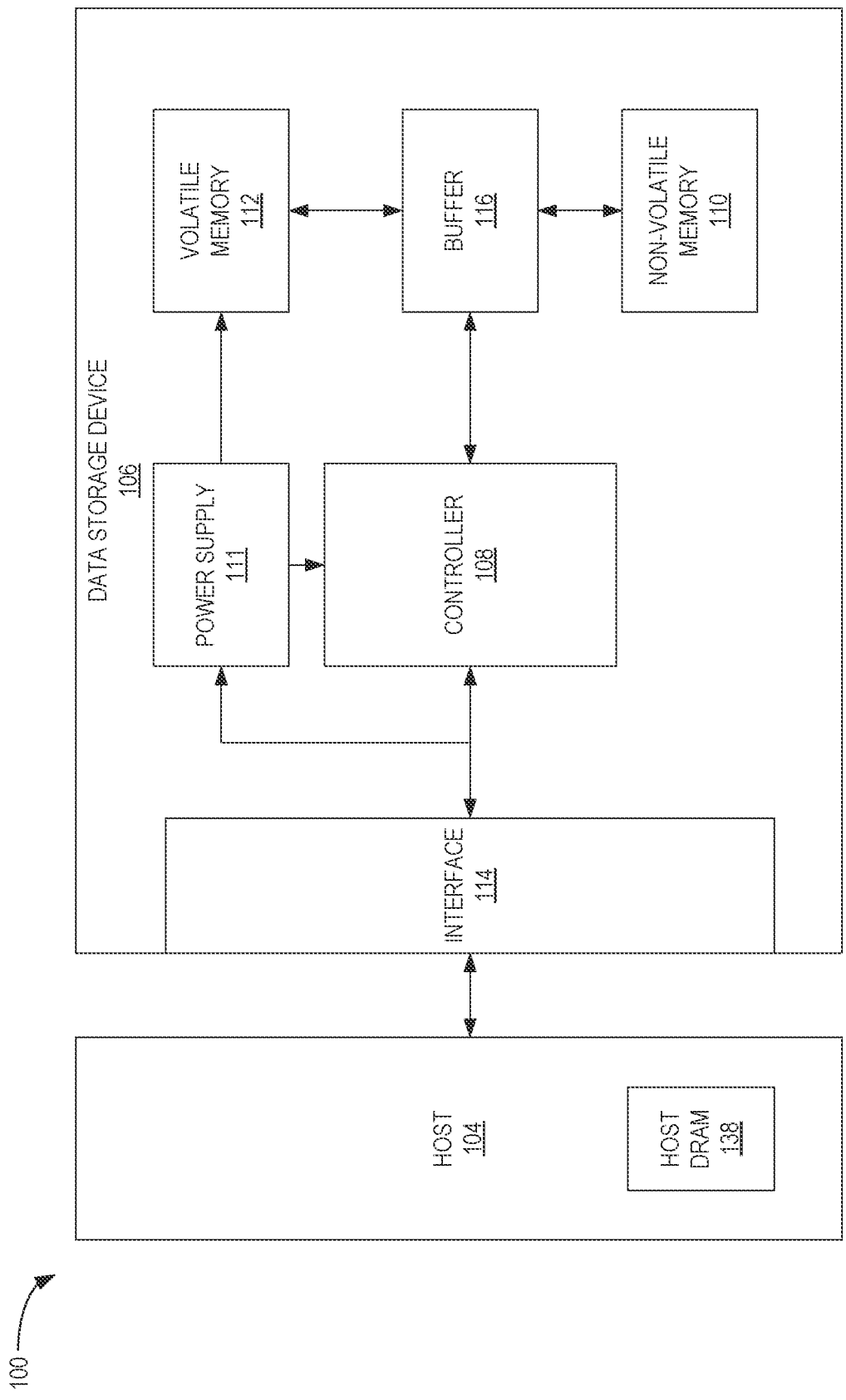
FIG. 1 is a schematic block diagram illustrating a storage system in which a data storage device may function as a storage device for a host device, according to certain embodiments.

FIG. 1 is a schematic block diagram illustrating a storage system 100 in which a host device 104 is in communication with a data storage device 106, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices, memory units, or memory arrays. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

Figure 2:
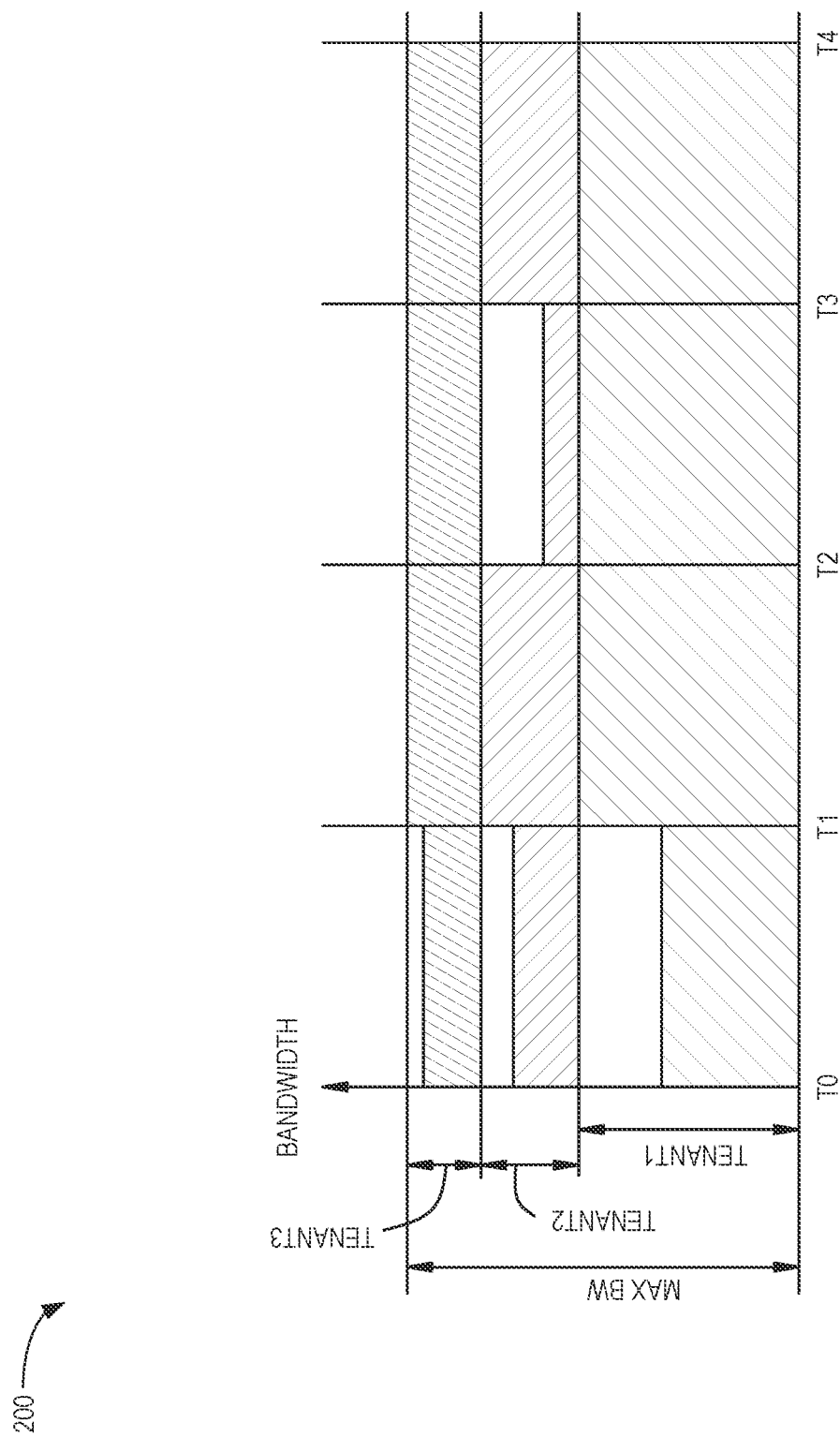
FIG. 2 is a graph illustrating an exemplary bandwidth usage over a period of time for a set number of tenants, according to certain embodiments.

FIG. 2 is a graph 200 illustrating an exemplary bandwidth usage over a period of time for a set number of tenants, according to certain embodiments. Graph 200 may describe the bandwidth utilization of an interface, such as the interface 114 of FIG. 1, or a controller, such as the controller 108 of FIG. 1. The x-axis represents time (T) and the y-axis represents a bandwidth utilization for a number of tenants (e.g., TENANT1, TENANT2, and TENANT3). The number of tenants illustrated and described are not intended to be limiting, but to provide an example of a possible embodiment. The maximum bandwidth (MAX BW) represents the maximum bandwidth of the interface 114 or the controller 108, where the maximum bandwidth represents how much data may be transferred across a data bus at a certain time point (e.g., T1, T2, T3, T4).

The bandwidth is split between each tenant, where each tenant may be one or more virtual host machines of a host device, such as the host device 104. Each of the tenants may be allocated a guaranteed bandwidth, where the guaranteed bandwidth may be the same or different between each of the tenants. As illustrated in graph 200, the guaranteed bandwidth for Tenant1 is greater than the guaranteed bandwidth for both Tenant2 and Tenant3. The guaranteed bandwidth illustrated is not intended to be limiting, but to provide an exemplary embodiment.

Between T0 and T1, each of the tenants do not have enough data being transferred to consume their entire respective guaranteed bandwidth. Thus, each of the tenants are utilizing less than their respective guaranteed bandwidth. Between T1 and T2, the data being transferred for each of the tenants has increased and each tenant is consuming the respective guaranteed bandwidth. The total consumed bandwidth between T1 and T2 equals the maximum bandwidth. Between T2 and T3, the bandwidth needed for Tenant2 decreases and less than the maximum bandwidth is used. Between T3 and T4, each tenant is consuming the respective guaranteed bandwidth. Therefore, the maximum bandwidth is utilized.

Figure 3:
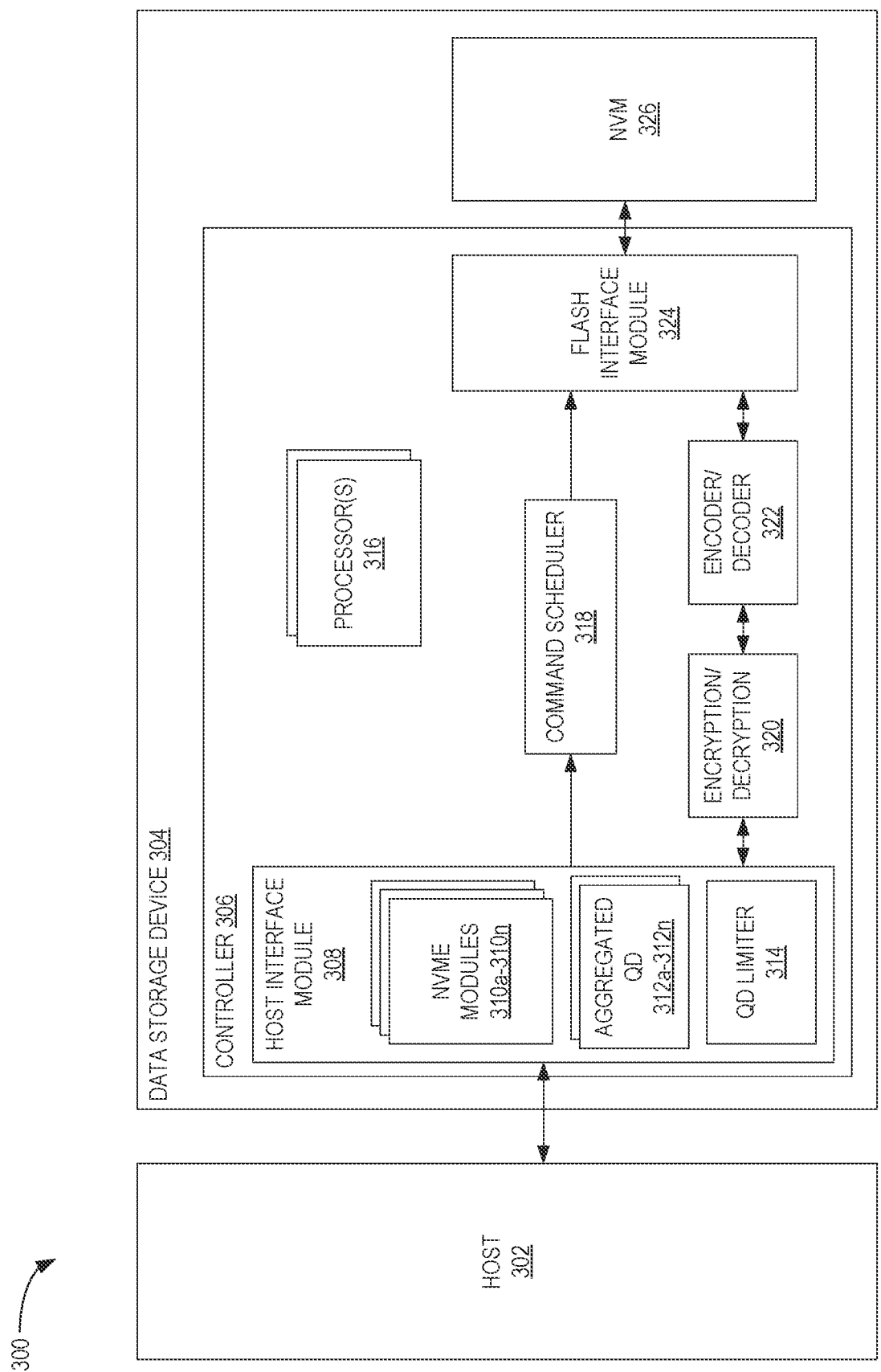
FIG. 3 is a schematic block diagram illustrating a storage system including a data storage device having a controller that manages maximum data transfer size (MDTS) per tenant and per command type, according to certain embodiments.

FIG. 3 is a schematic block diagram illustrating a storage system 300 including a data storage device 304 having a controller 306 that manages maximum data transfer size (MDTS) per tenant and per command type, according to certain embodiments. The storage system 300 may be the storage system 100 in some examples. The data storage device 304 is coupled to a host device 302, where the host device 302 sends data and commands to the controller 306. The data and commands are received at a host interface module (HIM) 308 of the controller 306. The controller 306 returns data corresponding to the received commands to the host device 302. The controller 306 further includes one or more processor(s) 316, a command scheduler 318, an encryption/decryption unit 320, an encoder/decoder unit 322, and a flash interface module (FIM) 324 coupled to an NVM 326, which may be one or more memory devices.

The HIM 308 includes one or more NVMe modules 310a-310n, one or more aggregated queue depths (QDs) 312a-312n, and a QD limiter 314. When the HIM 308 receives a command from a tenant, less than or equal to the bandwidth allocated to the tenant is allocated to the command, including the command data. Each of the one or more NVMe modules 310a-310n is associated with an aggregated QD of the one or more aggregated QDs 312a-312n. For example, the number of NVMe modules equals the number of aggregated QD, where an aggregated QD is associated with a respective NVMe module. The QD limiter 314 may be configured to limit a QD of the one or more aggregated QDs 312a-312n, so that the total bandwidth utilized by each of the one or more NVMe modules 310a-310n is less than or equal to the maximum bandwidth. In other words, the QD of the one or more aggregated QDs 312a-312n may be regulated by the QD limiter 314.

Referring back to FIG. 2, each tenant may have a specified MDTS, where each MDTS is defined during an initialization of the tenants. The MDTS refers to the maximum data that may be transferred due to the bandwidth allocation during a time slot (e.g., T0 to T1, T1 to T2, T2 to T3, etc.). One or more tenants may have the same MDTS and one or more tenants may have a different MDTS. The MDTS may be set on a per tenant basis in order to optimize or achieve better quality of service (QoS) control. For example, each tenant may have a MDTS for read commands and a MDTS for write commands, where the MDTS for read commands for each tenant may be the same or different and the MDTS for write commands for each tenant may be the same or different. The MDTS may be set by the one or more processor(s) 316. Furthermore, the controller 108 may limit the number of fetched commands (per tenant) from the host device 302. The QoS may be predetermined for each of the tenants during initialization of the link between each of the tenants and the data storage device 304. Furthermore, the QoS may be different for each of the tenants.

Based on the MDTS reported to the host device 302, the host device 302 schedules commands in the size of the MDTS for each respective tenant. Furthermore, the controller 306 may report an optimal aggregated input/output (IO) QD value to enable the host device 302 to dynamically optimize a workload distribution to the data storage device 304. For example, based on the reported optimal aggregated IO QD value, the host device 302 may limit the number of commands fetching indications (e.g., command ready doorbell) for each of the tenants.

The MDTS provided for each tenant may be different and may be a function of the percent of total bandwidth allocated to each tenant. Table 1 below provides an example of a relative MDTS calculation.

TABLE 1

| Tenant | % of Bandwidth | Internal MDTS |
|---|---|---|
| 1 | 50 | 1 MB |
| 2 | 30 | 600 KB |
| 3 | 10 | 200 KB |
| 4 | 10 | 200 KB |
| Total: 4 | 100% | 2 MB/time slot |

Referring to Table 1, the total MDTS per time slot is 2 MB, such that in a single time period (e.g., T0 to T1 in FIG. 2), the maximum data transfer size between the host device 302 and the controller 306 is 2 MB. The MDTS reported for Tenant1 is 1 MB because Tenant1 is allocated 50% of the total bandwidth. Furthermore, the one or more processor(s) 316 may provide a MDTS for read operations and another MDTS for write operations. Table 2 below provides an example of separate MDTS per operation type.

TABLE 2

| Tenant | % Read Bandwidth | % Write Bandwidth | Internal Read MDTS | Internal Write MDTS |
|---|---|---|---|---|
| 1 | 50 | 10 | 1 MB | 200 KB |
| 2 | 30 | 10 | 600 KB | 200 KB |
| 3 | 10 | 10 | 200 KB | 200 KB |
| 4 | 10 | 70 | 200 KB | 1.4 MB |
| Total: 4 | 100% | 100% | 2 MB/time slot | 2 MB/time slot |

Referring to Table 2, the total MDTS per time slot for read operations is 2 MB and the total MDTS per timeslot for write operations is 2 MB, such that in a single time period (e.g., T0 to T1 in FIG. 2), the maximum data transfer size for either read commands or write commands between the host device 302 and the controller 306 is 2 MB. The read operation MDTS reported for Tenant1 is 1 MB because Tenant1 is allocated 50% of the total bandwidth for read operations. Likewise, the write operation MDTS reported for Tenant1 is 200 KB because Tenant1 is allocated 10% of the total bandwidth for write operations. Furthermore, the one or more processor(s) 316 may provide a MDTS for read operations and another MDTS for write operations.

In another example, an aggregated QD of an NVMe module may be managed, where the aggregated QD is based on a QoS requirement for the tenant. Therefore, the aggregated QD may be different for each of the tenants. When the aggregated QD is increased for a tenant, then more outstanding commands may be aggregated for an IO queue of associated with the tenant. Therefore, the one or more processor(s) 316 may increase the MDTS for the tenant, so that more commands may be processed. Likewise, when the aggregated QD is decreased for a tenant, then less outstanding commands may be aggregated for an IO queue of associated with the tenant. Therefore, the one or more processor(s) 316 may decrease the MDTS for the tenant, so that less commands may be processed. Furthermore, the controller 306 may set a first aggregated QD for read operations and a second aggregated QD for write operations for each of the tenants.

In order to maintain QoS or achieve a target QoS, the QD limiter 314 may be utilized to limit the number of fetched commands per tenant. Tenants having higher QoS requirements have a larger MDTS than tenants having lower QoS requirements. In one example, the host device 302 may configure identical number of commands per tenant. For data storage device may balance QoS based on the number of commands per tenant rather than counting data size over a period of time.

It is to be understood that the previously listed MDTS adjustments may be done independently or concurrently. For example, the controller 306 may allocate different MDTS and/or aggregated QD settings per tenant in order to achieve better QoS control. Furthermore, in some examples, an unlimited (or otherwise very large) MDTS may be published for one or more tenants, such that commands may be split internally into smaller command parts prior to sending the command to the controller 306. In other examples, a smaller MDTS may cause the host device 302 to split up a large command into smaller command parts to adhere to the posted MDTS. The MDTS and the aggregated QD may be dynamically allocated, such that the MDTS and the aggregated QD for a tenant may be changed based on current IO, data storage device health, IO of other tenants, usage of the allocated bandwidth, and the like.

When the command arrives at the HIM 308, the relevant modules process the command and the data before sending the command to the command scheduler 318 and the data to the encryption/decryption unit 320. The command scheduler 318 processes the command and may generate additional internal commands to execute the command. The command is then passed to the FIM 324. The encryption/decryption unit 320 may be configured to encrypt data so that the data is secured from unauthorized reads of the data as well as decrypt encrypted data so that the data may be read by the host device 302. It is to be understood that the encryption/decryption unit 320 may be separate units, such that the controller 306 includes an encryption unit and a decryption unit.

The encrypted data is then passed to the encoder/decoder unit 322. The encoder/decoder unit 322 may be configured to encode encrypted data with error correction code (ECC) so that the controller 306 may be able to correct bits that are flipped or that have errors. The encoder/decoder unit 322 may be configured to decode encoded encrypted data in order to correct any bit flips or errors that have been found. It is to be understood that the encoder/decoder unit 322 may be separate units, such that the controller 306 includes an encoder unit and a decoder unit. The FIM 324 may be responsible for interacting with the NVM 326 to retrieve data programmed to the NVM 326 and to program data to the NVM 326.

Figure 4:
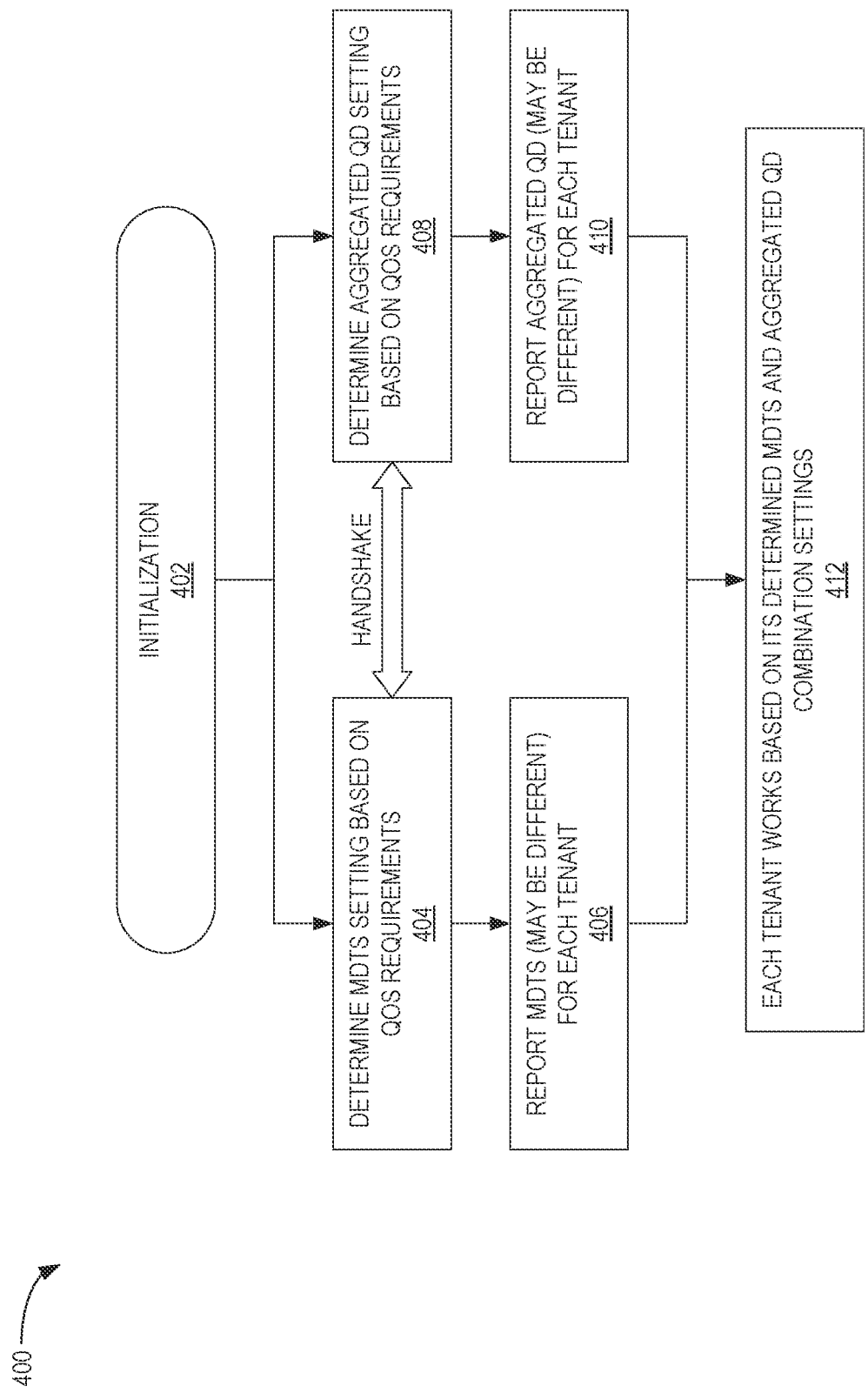
FIG. 4 is an exemplary flow diagram illustrating a method of improving quality of service (QoS) per tenant, according to certain embodiments.

FIG. 4 is an exemplary flow diagram illustrating a method 400 of improving QoS per tenant, according to certain embodiments. Method 400 may be implemented by the controller 306 of FIG. 3. Aspects of the storage system 300 may be referenced herein for exemplary purposes.

At block 402, a connection between the host device 302 and the data storage device 304 is initialized, such that one or more tenants are initialized. At block 404, the controller 306 determines relevant MDTS settings for each tenant based on QoS requirements. For example, the determination may be based on a % bandwidth allocated to each tenant. An example of the determination may be shown in Table 1 and Table 2 above. At block 406, the controller 306 reports the MDTS settings for each tenant back to the host device 302.

At block 408, the controller 306 determines relevant aggregated QD settings for each tenant based on QoS requirements. For example, a greater QoS requirement may result in a larger aggregated QD setting and vice-versa. At block 410, the controller 306 reports the aggregated QD settings for each tenant back to the host device 302. At block 412, the host device 302 manages each tenant based on the determined MDTS settings and aggregated QD combination settings. In some examples, either the MDTS settings or the aggregated QD settings is emphasized, such that the host device 302 sends commands per tenant based on either the MDTS settings or the aggregated QD settings. Furthermore, determining the MDTS setting may have an effect on determining the aggregated QD setting and vice-versa. Thus, by using a combined MDTS settings and aggregated QD settings for each tenant, better QoS control may be achieved.

Figure 5:
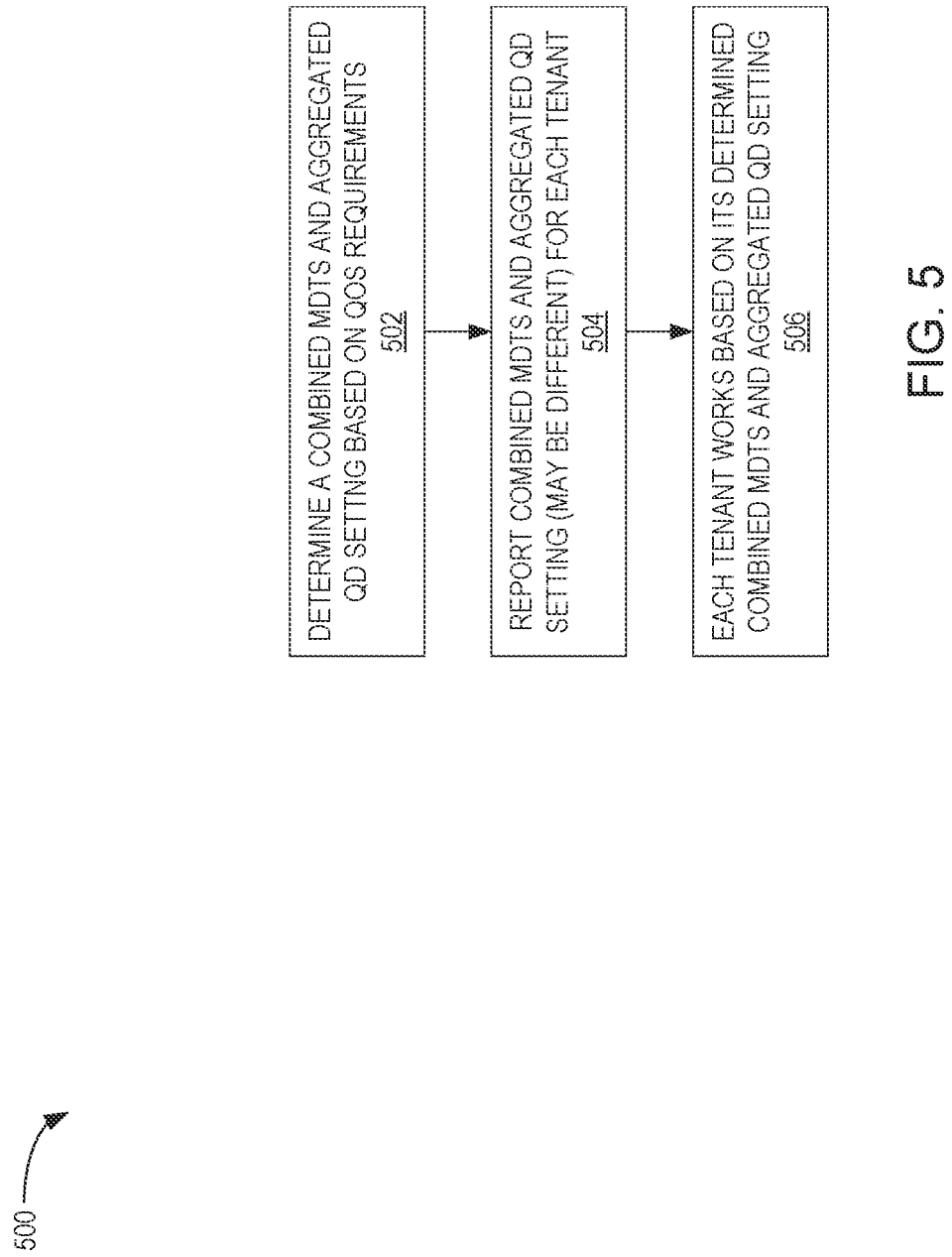
FIG. 5 is an exemplary flow diagram illustrating a method of improving quality of service (QoS) per tenant, according to certain embodiments.

FIG. 5 is an exemplary flow diagram illustrating a method 500 of improving quality of service (QoS) per tenant, according to certain embodiments. Method 500 may be implemented by the controller 306 of FIG. 3. Aspects of the storage system 300 may be referenced herein for exemplary purposes.

At block 502, the controller determines a combined MDTS and aggregated QD setting for a tenant based on QoS requirements. For example, the combined MDTS and aggregated QD setting may be a function of MDTS*Aggregated QD based on QoS requirements. At block 504, the controller 306 reports the determined combined MDTS and aggregated QD setting for each tenant to the host device 302. At block 506, the host device 302 manages each tenant based on the determined combined MDTS and aggregated QD settings.

By using adjusting the MDTS settings and aggregated QD settings for each of the tenants, the data storage device may achieve better QoS control and improve resource sharing based on the required QoS for long commands.

In one embodiment, a data storage device includes a memory device and a controller coupled to the memory device. The controller is configured to determine a maximum bandwidth of an interface, allocate a portion of the maximum bandwidth to one or more tenants, and provide a maximum data transfer size (MDTS) to each of the one or more tenants based on the portion of the maximum bandwidth allocated to the one or more tenants.

The MDTS is based on a predetermined quality of service (QoS) setting for each of the one or more tenants. The predetermined QoS setting for at least two of the one or more tenants is different. The MDTS is based on a read command bandwidth and a write command bandwidth. Providing the MDTS is based on an aggregated queue depth (QD) setting for each of the one or more tenants. The aggregated QD setting for at least two of the one or more tenants is different. The aggregated QD setting is based on a QoS setting for each of the one or more tenants. The aggregated QD setting is based on a read command bandwidth and a write command bandwidth.

In another embodiment, a data storage device includes a memory device and a controller coupled to the memory device. The controller is configured to determine a bandwidth allocation percentage for one or more tenants, wherein each of the one or more tenants has at least a read bandwidth and a write bandwidth, and allocate a maximum data transfer size (MDTS) for each of the one or more tenants based on an aggregated queue depth (QD) setting for each of the one or more tenants based on the bandwidth allocation percentage for the one or more tenants.

The bandwidth allocation percentage for the read bandwidth is distinct from the bandwidth allocation percentage for the write bandwidth. For at least one tenant of the one or more tenants, the bandwidth allocation percentage for the read bandwidth is different from the bandwidth allocation percentage for the write bandwidth. The read bandwidth for at least two tenants of the one or more tenants is different. The write bandwidth for at least two tenants of the one or more tenants is different. The controller is further configured to provide a MDTS to a host device to cause the host device to split commands into two or more parts. The controller is further configured to dynamically allocate the MDTS. Dynamically allocating is based on the aggregated QD setting each of the one or more tenants and a MDTS for the data storage device.

In another embodiment, a data storage device includes memory means, a controller coupled to the memory means. The controller includes a host interface module (HIM) coupled to a host device, one or more processors, one or more NVMe modules, one or more aggregated queue depth (QD) modules, and one or more QD limiters.

The HIM includes the one or more NVMe modules, the one or more aggregated QD modules, and the QD limiter. Each of the one or more NVMe modules has a maximum data transfer size (MDTS). The MDTS provided by the one or more processors. The MDTS is based on an aggregated QD of the one or more aggregated QD modules and a total bandwidth of the HIM. A number of the NVMe modules is equal to a number of the aggregated QD modules.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory; and
a controller coupled to the memory, the controller comprising a host interface module (HIM), one or more non-volatile memory (NVM) express (NVMe) modules, one or more aggregated queue depth (QD) modules, and a QD limiter, the controller configured to:
determine a maximum bandwidth of an interface using the QD limiter;
allocate a portion of the maximum bandwidth to one or more tenants; and
provide a maximum data transfer size (MDTS) to each of the one or more tenants based on the portion of the maximum bandwidth allocated to the one or more tenants.

2. The data storage device of claim 1, wherein providing the MDTS is based on a predetermined quality of service (QoS) setting for each of the one or more tenants.

3. The data storage device of claim 2, wherein the predetermined QoS setting for at least two of the one or more tenants is different.

4. The data storage device of claim 2, wherein the MDTS is based on a read command bandwidth and a write command bandwidth.

5. The data storage device of claim 1, wherein providing the MDTS is based on an aggregated queue depth (QD) setting for each of the one or more tenants.

6. The data storage device of claim 5, wherein the aggregated QD setting for at least two of the one or more tenants is different.

7. The data storage device of claim 5, wherein the aggregated QD setting is based on a QoS setting for each of the one or more tenants.

8. The data storage device of claim 5, wherein the aggregated QD setting is based on a read command bandwidth and a write command bandwidth.

9. A data storage device, comprising:
a memory; and
a controller coupled to the memory, the controller comprising a host interface module (HIM), one or more non-volatile memory (NVM) express (NVMe) modules, one or more aggregated queue depth (QD) modules, and a QD limiter, the controller configured to:
determine a bandwidth allocation percentage for one or more tenants, wherein each of the one or more tenants has at least a read bandwidth and a write bandwidth; and
allocate a maximum data transfer size (MDTS) for each of the one or more tenants based on an aggregated queue depth (QD) setting for each of the one or more tenants based on the bandwidth allocation percentage for the one or more tenants using the one or more aggregated QD modules.

10. The data storage device of claim 9, wherein the bandwidth allocation percentage for the read bandwidth is distinct from the bandwidth allocation percentage for the write bandwidth.

11. The data storage device of claim 10, wherein, for at least one tenant of the one or more tenants, the bandwidth allocation percentage for the read bandwidth is different from the bandwidth allocation percentage for the write bandwidth.

12. The data storage device of claim 9, wherein the read bandwidth for at least two tenants of the one or more tenants is different.

13. The data storage device of claim 9, wherein the write bandwidth for at least two tenants of the one or more tenants is different.

14. The data storage device of claim 9, wherein the controller is further configured to provide a MDTS to a host device to cause the host device to split commands into two or more parts.

15. The data storage device of claim 9, wherein the controller is further configured to dynamically allocate the MDTS.

16. The data storage device of claim 15, wherein dynamically allocating is based on the aggregated QD setting each of the one or more tenants and a MDTS for the data storage device.

17. A data storage device, comprising: memory means;
a controller coupled to the memory means, the controller comprising:
a host interface module (HIM) coupled to a host device;
one or more processors;
one or more non-volatile memory (NVM) express (NVMe) modules;
one or more aggregated queue depth (QD) modules; and
a QD limiter, wherein each of the one or more NVMe modules has a maximum data transfer size (MDTS), wherein the MDTS provided by the one or more processors, and wherein the MDTS is based on an aggregated QD of the one or more aggregated QD modules and a total bandwidth of the HIM.

18. The data storage device of claim 17, wherein the HIM comprises the one or more NVMe modules, the one or more aggregated QD modules, and the QD limiter.

19. The data storage device of claim 17, wherein a number of the NVMe modules is equal to a number of the aggregated QD modules.

20. The data storage device of claim 17, wherein the controller is configured to:
determine a combined MDTS and aggregated QD setting for a tenant based on quality of service (QoS) requirements;
report the determined combined MDTS and aggregated QD setting for each tenant to a host device; and
manage each tenant based on the determined combined MDTS and aggregated QD setting.

* * * * *